(12) United States Patent  
Williams et al.

(10) Patent No.: US 9,243,740 B2
(45) Date of Patent: Jan. 26, 2016

(54) BRACKET ASSEMBLY FOR ENGINE COMPARTMENT COMPONENT

(71) Applicant: Toyota Motor Engineering & Manufacturing North America, Inc., Erlanger, KY (US)

(72) Inventors: Alan K. Williams, West Bloomfield, MI (US); Chad A. Barnes, Saline, MI (US); Eric F. Bursch, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 398 days.

(21) Appl. No.: 13/673,046

(22) Filed: Nov. 9, 2012

(65) Prior Publication Data

US 2013/0270416 A1    Oct. 17, 2013

Related U.S. Application Data

(60) Provisional application No. 61/623,344, filed on Apr. 12, 2012.

(51) Int. Cl.
*F16M 1/02* (2006.01)
*F16M 13/00* (2006.01)
(Continued)

(52) U.S. Cl.
CPC .............. *F16M 13/00* (2013.01); *B60K 11/02* (2013.01); *F16M 1/00* (2013.01); *F16M 1/02* (2013.01); *F16M 1/021* (2013.01); *F16M 1/026* (2013.01)

(58) Field of Classification Search
CPC ......... F16M 13/00; F16M 1/00; F16M 1/021; F16M 1/08; F16M 1/04; F16M 1/025; F16M 1/026

USPC ......... 248/674, 300, 903, 603, 604, 659, 675; 417/360, 313, 53, 213.1, 423.15, 361; 29/432, 448, 449, 446, 889.3
See application file for complete search history.

(56) References Cited

U.S. PATENT DOCUMENTS 3,773,285 A * 11/1973 Morrill .................... 248/603
3,790,114 A * 2/1974 Italiano et al. .............. 248/675
(Continued)

FOREIGN PATENT DOCUMENTS

JP         04-086330 A      3/1992
JP         2001-065361 A    3/2001
(Continued)

OTHER PUBLICATIONS

International Search Report for PCT/US2013/033801, dated Jul. 11, 2013.

*Primary Examiner* — Nkeisha Smith
(74) *Attorney, Agent, or Firm* — Dinsmore & Shohl LLP

(57) ABSTRACT

A bracket assembly configured to mount an engine component to the vehicle body is provided. The bracket assembly includes a first body bracket, a second body bracket, a rod and a third body bracket. The first body bracket is configured to hold the component. The second and third body brackets are both configured to attach to the structure within the engine compartment. The rod may be dimensioned so as to place the third body bracket in a desired spatial orientation with respect to the first and second body brackets. Accordingly, the bracket assembly is operable to accommodate two of the same components within the engine compartment by allowing the components to be in different spatial relationships relative to the engine compartment.

6 Claims, 5 Drawing Sheets

(51) Int. Cl.
*F16M 1/00* (2006.01)
*F16M 1/021* (2006.01)
*F16M 1/026* (2006.01)
*B60K 11/02* (2006.01)

(56) References Cited

U.S. PATENT DOCUMENTS

| | | | | |
|---|---|---|---|---|
| 3,847,330 A * | 11/1974 | Morrison | | 248/670 |
| 4,155,528 A * | 5/1979 | Dawson | | 248/674 |
| 4,155,529 A * | 5/1979 | Maudlin | | 248/604 |
| 4,200,257 A * | 4/1980 | Litch, III | | 248/604 |
| 4,253,634 A * | 3/1981 | Daniels | | 248/604 |
| 4,293,114 A * | 10/1981 | Lykes | | 248/604 |
| 4,482,124 A * | 11/1984 | Dochterman | | 248/604 |
| 4,572,472 A * | 2/1986 | Eder | | 248/605 |
| 4,597,555 A * | 7/1986 | Weihsmann | | 248/672 |
| 4,759,526 A * | 7/1988 | Crawford et al. | | 248/604 |
| 4,849,667 A * | 7/1989 | Morrill | | 310/91 |
| 5,069,415 A * | 12/1991 | Mechalas | | 248/674 |
| 5,492,456 A * | 2/1996 | Knight et al. | | 417/360 |
| 5,772,176 A * | 6/1998 | Keck et al. | | 248/638 |
| 6,761,343 B2 * | 7/2004 | Clark et al. | | 248/674 |
| 7,513,754 B2 * | 4/2009 | Clark et al. | | 417/360 |
| 7,810,762 B2 * | 10/2010 | Condon et al. | | 248/74.1 |
| 8,292,575 B2 * | 10/2012 | Kim et al. | | 415/204 |
| 8,876,092 B2 * | 11/2014 | Wojcieson | | 267/136 |
| 2005/0116124 A1 * | 6/2005 | Mielke et al. | | 248/74.3 |
| 2006/0038106 A1 * | 2/2006 | Geroux et al. | | 248/603 |
| 2007/0246614 A1 * | 10/2007 | Allmann et al. | | 248/65 |
| 2012/0132783 A1 * | 5/2012 | Jia | | 248/674 |

FOREIGN PATENT DOCUMENTS

| | | |
|---|---|---|
| JP | 2007-162712 A | 6/2007 |
| JP | 2008-240628 A | 10/2008 |
| KR | 2004-0029736 A | 4/2004 |

* cited by examiner

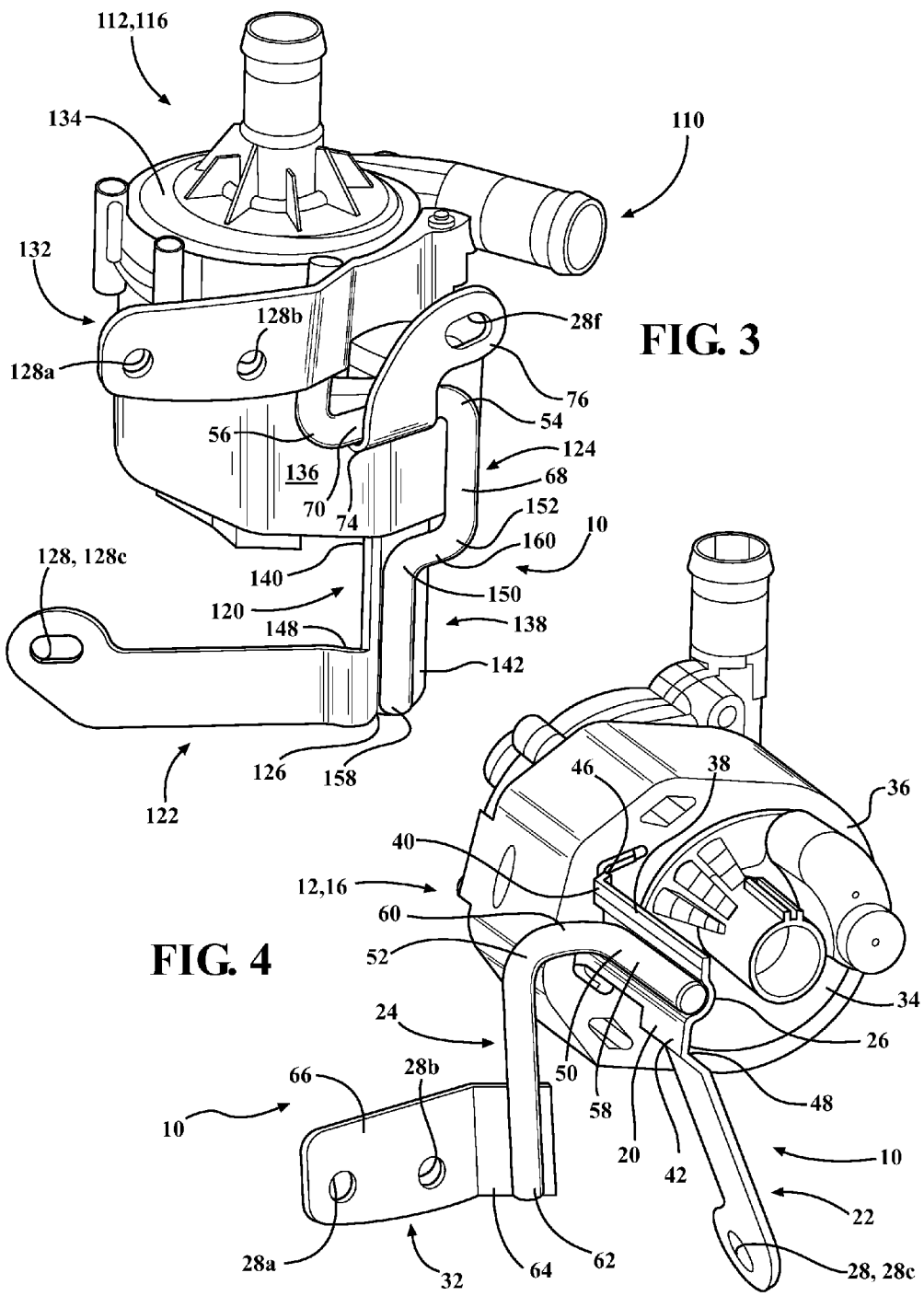

US 9,243,740 B2

BRACKET ASSEMBLY FOR ENGINE COMPARTMENT COMPONENT

CROSS-REFERENCE TO RELATED APPLICATIONS

This Application claims the benefit of U.S. Provisional Application 61/623,344 filed on Apr. 12, 2012.

FIELD OF THE INVENTION

The invention is directed towards a bracket assembly operable to provide flexibility for the installation of a component within a compartment.

BACKGROUND OF THE INVENTION

Installation of a component within a compartment may be difficult as some of the components are shaped differently. For instance, the engine compartment of an automotive vehicle includes many different components aside from the vehicle engine. The components are attached to the vehicle body, or the engine itself, and packaged within the engine compartment. In cases where the vehicle is driven by electric power, the engine is an electric motor and the engine compartment may include a plurality of pumps and tanks containing coolants. The engine compartment may further include a battery, hoses and pipes for cooling the engine compartment, and the like. Thus space within the engine compartment may become an issue as the introduction of more components requires redesigning the packaging of the components within the engine compartment.

Further, in cases where the engine compartment includes more than one of the same component, it may not be possible to position the like components in the same orientation. Accordingly, brackets which attach the components to the vehicle body must be stamped into different shapes to accommodate the packaging restraints within the engine compartment. This increases the cost of packaging the engine compartment and does not allow the flexibility needed to install a desired component. Instead, engineers must redesign the engine compartment package. As used herein the engine compartment package refers to the orientation and placement of various components within the engine compartment. Accordingly, it remains desirable to have a bracket assembly which may be customized to allow like components to be placed in different spatial orientation within the engine compartment so as to reduce the need to manufacture a different attachment part for a common component.

SUMMARY OF THE INVENTION

According to one aspect of the invention, a bracket assembly configured to mount a component, such as a pump assembly within a desired space of a compartment such as the engine compartment of an automotive vehicle, is provided. The bracket assembly includes a first body bracket, a second body bracket, a third body bracket, and a rod interconnecting the first and second body brackets to the third body bracket. The rod may be dimensioned so as to place the component in a desired spatial orientation with respect to the first and second body brackets. The first and second body brackets and rod may be stamped from a sheet of steel.

The first body bracket is configured to receive the component. The first body bracket is formed of a durable and generally rigid material having a surface area configured to attach to the vehicle component. The first body bracket is further configured to receive a portion of the rod.

The second body bracket is configured to attach to the vehicle body. The second body bracket is generally a planar member formed of a durable and rigid material such as steel. The second body bracket may include a plurality of apertures. A mechanical fastener such as a bolt may be passed through the apertures so as to attach the second body bracket to the vehicle body or directly to the engine housing.

The third body bracket is formed as a separate piece from the first and second body brackets. The third body bracket is configured to engage a structure within the compartment. The third body bracket is further configured to receive a portion of the rod.

The rod interconnects both the first and second body brackets to the third body bracket. The rod may be formed of a rigid, durable and resilient material which may be shaped using heat, jigs, forming dies or the like, but will retain its shaped position once formed. Such material is currently known and used in the art, and illustratively includes steel. The rod may be bent to achieve a desired spatial dimension between the vehicle component and the engine so as to fit the vehicle component within a desired space of the engine compartment. It should be appreciated that the bent rod may be further re-shaped or otherwise tuned so as to change the spatial relationship between both the first and second body brackets with respect to the third body bracket so as to provide for a better fit. Accordingly, the bracket assembly may be used to attach two like components to the vehicle body, but allow the spatial orientation of the respective like components to be different so as to accommodate the packaging constraints within the engine compartment. Further, the bracket assembly is universal with respect to like components, and thus eliminates the need for two distinct brackets accommodating the different spatial orientations of the like components within the engine compartment.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a perspective view of an embodiment of the bracket assembly engaging a pump assembly;

FIG. 4 is a perspective view of another embodiment of the bracket assembly engaging a pump assembly;

DETAILED DESCRIPTION OF THE INVENTION

Figure 1:
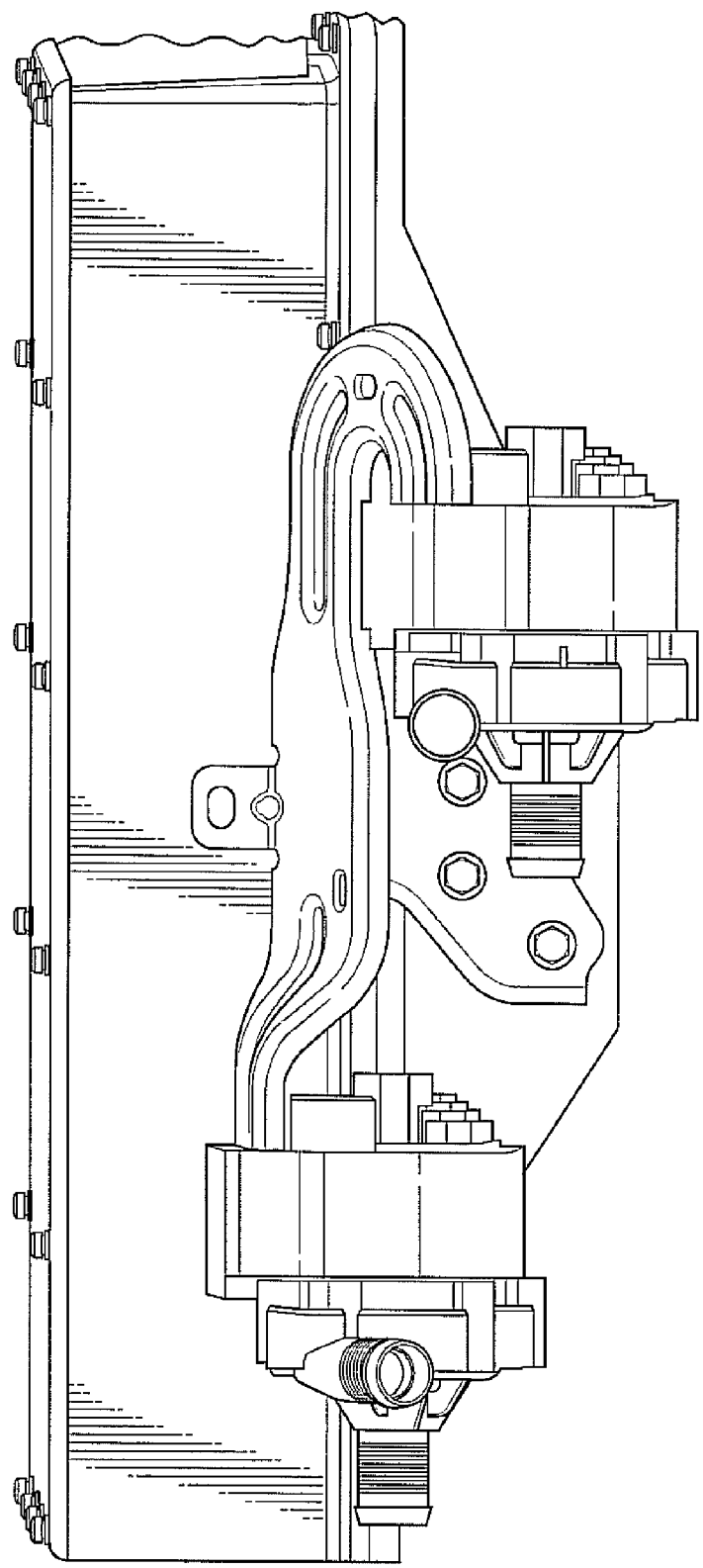
FIG. 1 is a perspective view of a bracket assembly of the prior art.

With reference now to the FIGS. 2-7, a bracket assembly 10 configured to mount a component 12 within a predetermined space of a compartment 14 is provided. For illustrative purposes the component 12 is shown as a pump assembly 16 and the compartment 14 is shown as an engine compartment 14 typically located beneath the hood (not shown) of the automotive vehicle (not shown). The bracket assembly 10 may be used to attach the component 12 to a vehicle body structure 18 within the engine housing of an automotive vehicle. Thus, in instances where two like components 12 are housed within the engine compartment 14, the same bracket assembly 10 may be used.

The bracket assembly 10 includes a first body bracket 20, a second body bracket 22, and a rod 24 interconnecting both the first body bracket 20 to second body bracket 22 to a third body bracket 32. The first and second body brackets 20, 22 may be stamped from a sheet of steel so as to form a unitary body. The rod 24 may be shaped so as to place the vehicle component 12 within the available space of an engine compartment 14.

The first body bracket 20 is configured to receive the component 12. The first body bracket 20 is formed of a durable and generally rigid material having a surface area configured to receive the vehicle component 12. The first body bracket 20 is a generally elongated body and includes a groove 26 extending the length of the body. The groove 26 is dimensioned to fittingly receive a portion of the rod 24.

The second body bracket 22 is configured to attach to a vehicle body structure 18, such as a side wall of the vehicle's front side panel. The second body bracket 22 may include an aperture 28c for receiving a mechanical fastener such as a bolt 30. It should be appreciated that the second body bracket 22 may include a plurality of apertures 28 to allow for more mechanical fasteners. The second body bracket 22 may be configured to flushingly engage the vehicle body structure 18.

The rod 24 is a generally elongated member formed of a durable yet resilient material such as steel. The rod 24 is shown as a generally cylindrical member, but may be shaped otherwise. A portion of the rod 24 is mounted to the groove 26 of the first body bracket 20, and may be shaped, as shown in FIGS. 3-6, in various manners to accommodate the vehicle component 12 within the engine compartment 14. The rod 24 may be bent in numerous ways to accommodate the packaging constraints of the engine compartment 14.

The third body bracket 32 is stamped as a separate piece. The third body bracket 32 is configured to receive a portion of the rod 24. The third body bracket 32 is further configured to attach to a structure 18 within the engine compartment 14.

Figure 2:
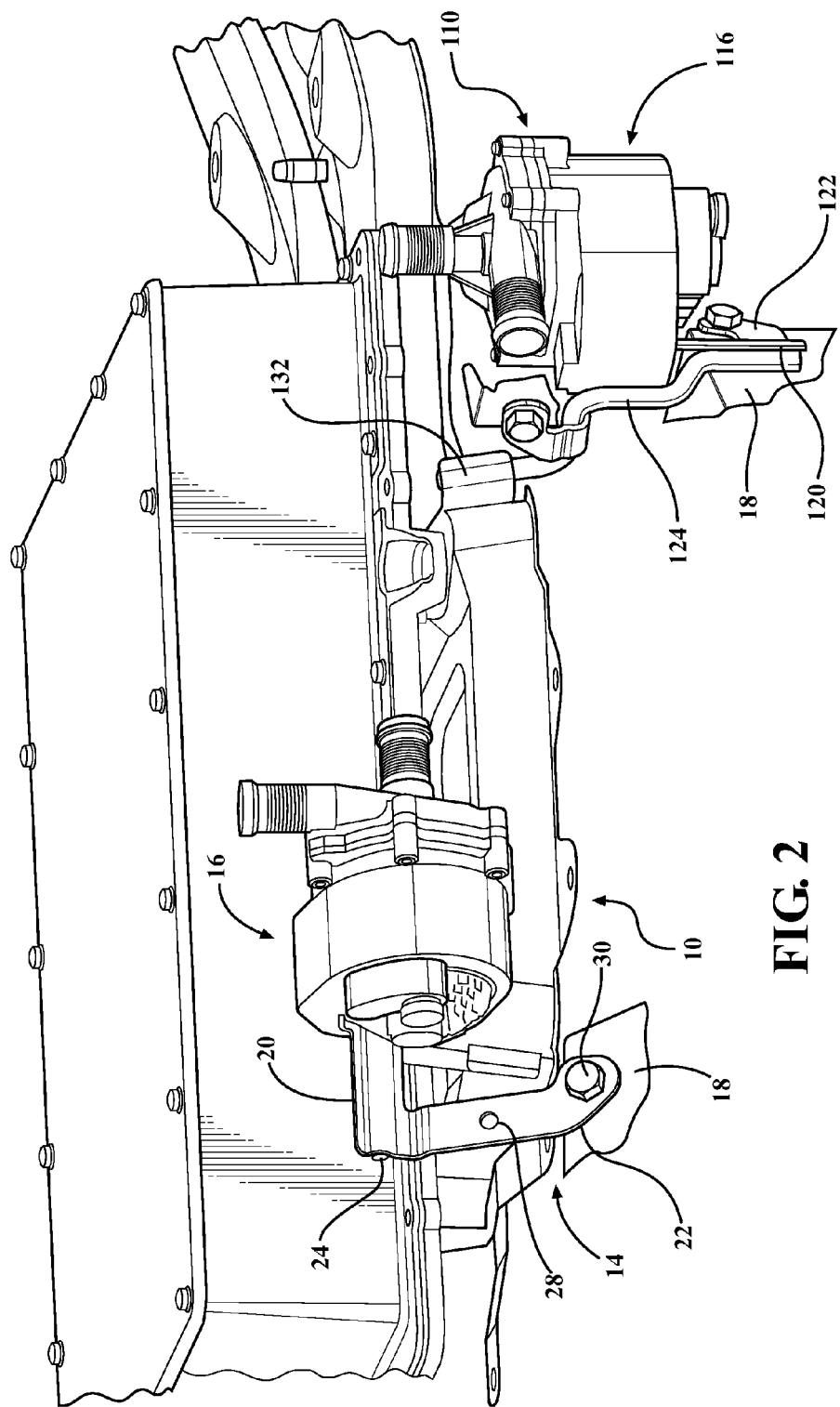
FIG. 2 is a perspective view of two bracket assemblies mounting respective pump assemblies to a vehicle engine.
Figure 6:
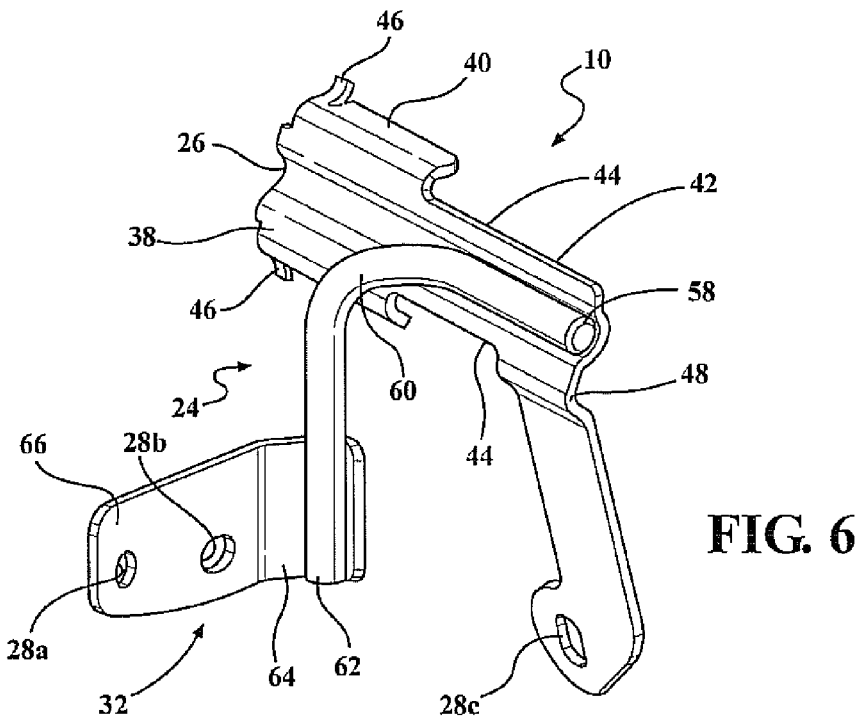
FIG. 6 is a is an isolated view of the bracket assembly shown in FIG. 4.

With reference first to FIGS. 2, 4 and 6, a first preferred embodiment of the bracket assembly 10 is provided. The bracket assembly 10 is configured to attach a vehicle component 12 within a desired space of the engine compartment 14. The vehicle component 12 is illustratively shown as a pump assembly 16. The pump assembly 16 includes a pump housing 34, and an insulating sleeve 36 adapted to hold the pump housing 34.

The insulating sleeve 36 may be formed of a material having insulating properties, but resistant to the high temperatures associated with engine compartments 14. The insulating sleeve 36 includes a side wall. The side wall is a generally continuous member enclosing a space and defining a through hole. The sleeve is dimensioned to fittingly receive a portion of the pump housing 34 through the though hole. The pump housing 34 may be fixed to the sleeve using a mechanical fastener such as a bolt 30. Thus a faulty pump may be removed to allow for a replacement pump to be used.

The first body bracket 20 includes an elongated body member 38, having a mounting portion 40 and a support portion 42. A pair of side edges 44 extends along the length of the elongated body member 38. The groove 26 is generally centered between the pair of side edges 44. The groove 26 extends the length of the elongated body member 38. The groove 26 is configured to fittingly receive a portion of the rod 24. Specifically, a portion of the rod 24 is mounted to the portion of the groove 26 disposed within the support portion 42 of the rod 24. The rod 24 may be attached to the groove 26 by application of spot weld.

Each side edge 44 includes a flange 46 adapted to engage a receiving portion of the vehicle component 12. The flanges 46 are disposed on a first end of the mounting portion 40 of the first body bracket 20. The flanges 46 flare upwardly with respect to elongated body member 38. In particular, the flanges 46 are adapted to fittingly engage a bottom surface of the insulating sleeve 36 in a snap fit manner, as illustratively shown in FIG. 4.

The second body bracket 22 may be integrally formed with the first body bracket 20. The second body bracket 22 extends outwardly from a side edge 44 of the first body bracket 20, and is shown disposed at an end of the support portion 42 of the first body bracket 20. A portion of the second body bracket 22 is generally circular and includes an aperture 28c so as to provide a surface for attaching the bracket assembly 10 to a structure 18 such as the vehicle body structure 18 located within the engine compartment 14. A proximal end of the second body bracket 22 includes a rib 48 configured to allow for flexibility in dimension with respect to the first body bracket 20. For instance, the rib 48 facilitates the pivot of the second body bracket 22 about the side edge 44 of the first body bracket 20.

The rod 24 may be formed and shaped in response to the packaging space of the engine compartment 14 so as to position the first and second body brackets 20, 22 and the component 12 within the confines of the available space within the engine compartment 14. The rod 24 is illustratively shown having two bends 50, 52. However, it should be appreciated that the number of bends is based upon the packaging space available within the engine compartment 14. The first bend 50 of the rod 24 defines a first portion 58 of the rod 24, which is shown spot welded to the groove 26 of the first body bracket 20 along the support portion 42. The second bend 52 is spaced apart from the first bend 50 so as to define an intermediary portion 60 and a free end portion 62. The intermediary portion 60 extends away from the first body bracket 20. The second bend 52 interconnects the intermediary portion 60 to a free end portion 62 so as to position the free end of the rod 24 generally parallel to the second body bracket 22.

The third body bracket 32 is attached to the free end portion 62 of the rod 24. The third body bracket 32 may be attached thereto using a spot weld. The third body bracket 32 includes a first attachment portion 64 and a second attachment portion 66. The first attachment portion 64 is angled relative to the second attachment portion 66. The first and second attachment portions 64, 66 form a unitary body. The first attachment portion 64 may include an arcuate surface adapted to receive an end portion of the rod 24. The second attachment portion 66 may be generally planar and includes apertures 28a, 28b to accommodate a mechanical fastening device such as a bolt 30.

Figure 5:
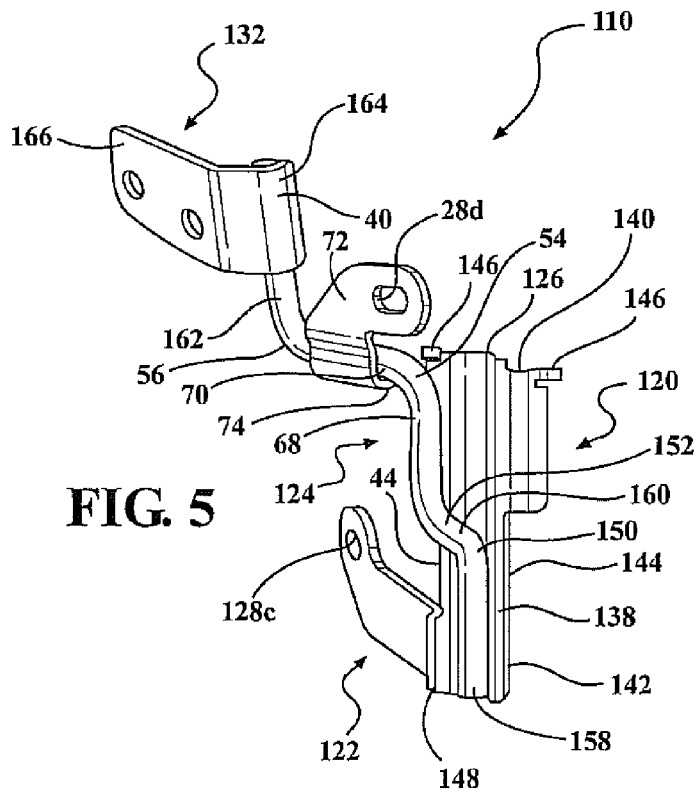
FIG. 5 is a is an isolated view of the bracket assembly shown in FIG. 3.

With reference now to FIGS. 2, 3 and 5, a second preferred embodiment of the bracket assembly 110 is provided, wherein like parts are indicated by numerals offset by 100. The bracket assembly 110 is also shown mounting a pump assembly 116 within the available space of the engine compartment 114. The bracket assembly 110 may be further adjusted to better accommodate the engine component 112 within the available space by bending the rod 124, or pivoting the second body bracket 122 with respect to the first body bracket 120.

The first body bracket 120 includes an elongated body member 138, having a mounting portion 140 and a support portion 142. A pair of side edges 144 extends along the length of the elongated body member 138. Each side edge 144 is disposed on opposite edges of a groove 126. The groove 126 extends the length of the elongated body. The groove 126 is configured to fittingly receive a portion of the rod 124. Specifically, a portion of the rod 124 is mounted to the portion of the groove 126 disposed within the support portion 142 of the rod 124. The rod 124 may be attached to the groove 126 by application of spot weld.

Each side edge 144 includes a flange 146 adapted to engage a receiving portion of the vehicle component 112. The flanges 146 are disposed on a first end of the mounting portion 140 of the first body bracket 120. The flanges 146 flare upwardly with respect to elongated body member 138. In particular, the flanges 146 are adapted to fittingly engage a bottom surface of the insulating sleeve 136 in a snap fit manner, as illustratively shown in FIG. 4.

The second body bracket 122 extends outwardly from a side edge 144 of the first body bracket 120, and is disposed at an end of the first body bracket 120. A free end of the second body bracket 122 is generally circular and includes an aperture 128c so as to provide a surface for attaching the bracket assembly 110 to a structure 118 such as the vehicle body structure 118 located within the engine compartment 114. A proximal end of the second body bracket 122 includes a rib 148 configured to allow for flexibility in dimension with respect to the second body member. For instance, the rib 148 facilitates the pivot of the second body bracket 122 about the side edge 144 of the first body bracket 120.

The rod 124 may be formed and shaped in response to the packaging space of the engine compartment 114 so as to position the first and second body brackets 120, 122 and the component 112 within the confines of the available space within the engine compartment 114. The rod 124 is illustratively shown having four bends 150, 152, 54, 56. However, it should be appreciated that the number of bends is based upon the packaging space available within the engine compartment 114.

The rod 124 includes a first bend 150, a second bend 152, a third bend 54 and a fourth bend 56. Each bend is spaced apart from the other so as to define a first portion 158, a first intermediary portion 160, a second intermediary portion 68, a third intermediary portion 70, and a free end portion 162. The first bend 150 is disposed between the first portion 158 and the first intermediary portion 160. The second bend 152 is disposed between the first intermediary portion 160 and the second intermediary portion 68. The third bend 54 is disposed between the second intermediary portion 68 and the third intermediary portion 70. The fourth bend 56 is disposed between the third intermediary portion 70 and the free end portion 162.

The first portion 158 of the rod 124 is fixed to the groove 126 disposed on the support portion 142 of the first body bracket 120. The first intermediary portion 160 extends from the first bend 150 at an angle away from the first body bracket 120. The second intermediary portion 68 of the rod 124 extends from the second bend 152 so as to be generally parallel to and spaced apart from the first body bracket 120. The third intermediary portion 70 extends from the third bend 54 and is generally parallel to the second body bracket 122. The free end portion 162 extends from the fourth bend 56 so as to be generally parallel to the first body bracket 120.

The bracket assembly 110 further includes a fourth body bracket 72. The fourth body bracket 72 may be stamped as a separate part relative to the first and second body brackets 120, 122 and the third body bracket 132. The fourth body bracket 72 includes a first planar member 74 and a second planar member 76. The first planar member 74 extends outwardly relative to an upper edge of the first body bracket 20. The first planar member 74 is generally orthogonal to the second planar member 76 so as to define a generally "L" shaped piece. The fourth body bracket 72 includes a hemispherical portion 78 having an aperture 28f configured to attach the bracket assembly 110 to a vehicle structure 118. A mechanical fastening device such as a bolt 130 may be fitted through the aperture 28f so as to help secure the bracket assembly 110 within the engine compartment 114. The third intermediary portion 70 of the rod 124 is fixed to the first planar member 74.

A free end of the rod 124 extends upwardly from the tangentially extending portion. The third body bracket 132 is attached to the free end of the rod 124. The third body bracket 132 may be attached thereto using a spot weld. The third body bracket 132 includes a first attachment portion 164 and a second attachment portion 166. The first attachment portion 164 is angled relative to the second attachment portion 166. The first and second attachment portions 164, 166 form a unitary body. The first attachment portion 164 may include an arcuate surface adapted to receive an end portion of the rod 124. The second attachment portion 166 may be generally planar and includes apertures 128a, 128b to accommodate a mechanical fastening device such as a bolt 30.

Figure 7:
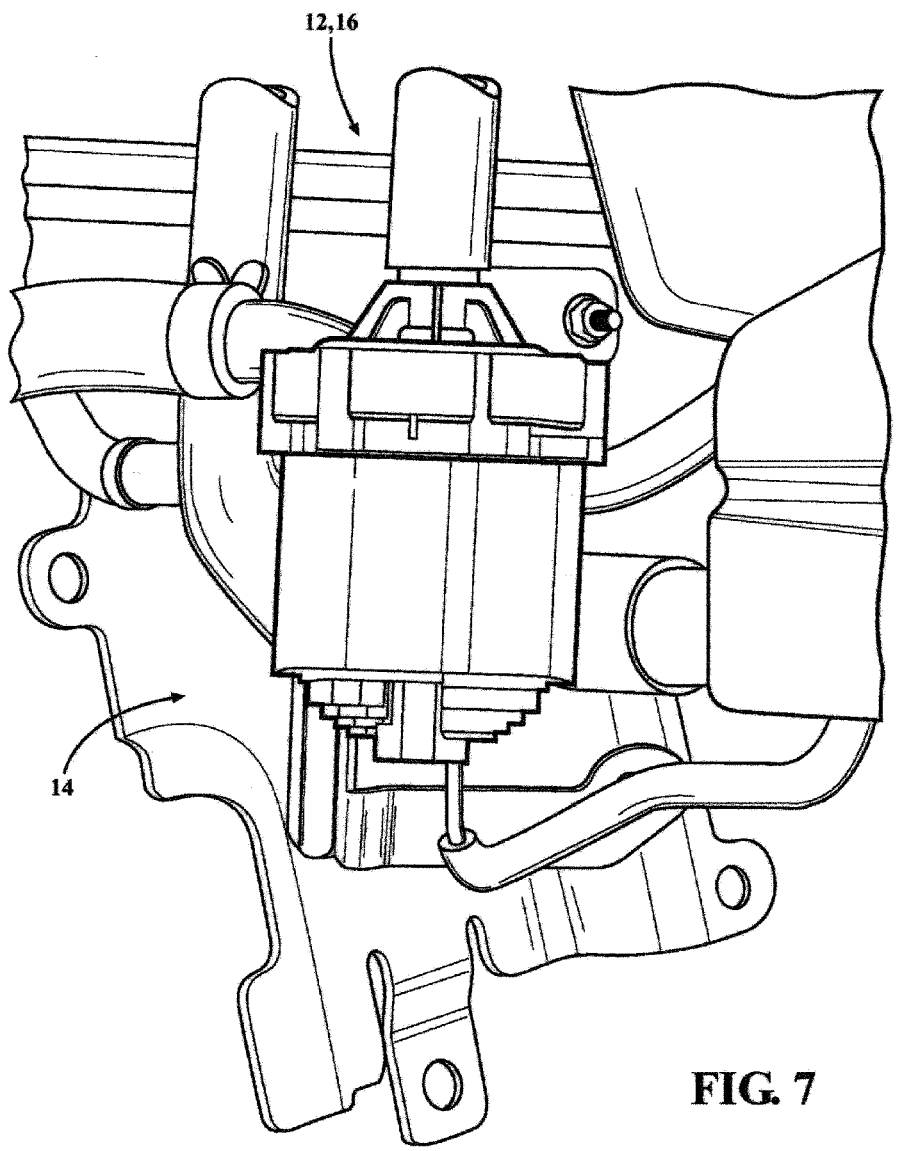
FIG. 7 is a perspective view of the engine compartment showing the various components and packaging consideration.

With reference now to FIG. 7, the packaging constraint of the engine compartment 14 is illustrated. In particular, the packaging constraints within the engine compartment 14 may not allow the pump assemblies 16 to be oriented in the same spatial relationship with respect to the vehicle body. However, the pump assemblies 16 are like components 12, and include similar attachment features. Accordingly, it is desirable to have a bracket assembly 10 configured to mount the pump assembly 16 within the available space of an engine compartment 14, wherein the each pump assembly 16 is mounted in a different spatial orientation with respect to the other. Accordingly, the bracket assembly 10 disclosed herein allows an installer to use the same bracket assembly 10 but adjust the spatial orientation of each common component 12 to accommodate available space within the engine compartment 14.

Obviously, many modifications and variations of the present invention are possible in light of the above teachings and may be practiced otherwise than as specifically described while within the scope of the invention.

The invention claimed is:

1. A bracket assembly configured to mount a component to a structure within a space of a compartment, the bracket assembly comprising:
   a first body bracket having an elongated body member and configured to engage the component;
   a second body bracket adapted to receive a mechanical fastener so as to secure the second body bracket to the structure within the compartment, the second body bracket is disposed at an end of the first body bracket and extends outwardly from a side edge of the first body bracket;
   a third body bracket having a rod portion and a support surface, the support surface for attaching the third body bracket to the structure within the compartment, the third body bracket includes a first attachment portion and a second attachment portion, the a first attachment portion angled relative to the second attachment portion; and
   a rod mounted to both the third body bracket and the first body bracket, the rod formed of a durable and resilient material so as to be shaped in a manner configured to fit the component within the space of the compartment, the rod includes a first bend spaced apart from a second bend so as to define a first portion, an intermediary portion, and a free end portion, the first bend disposed between the first portion and the intermediary portion, the second bend disposed between the intermediary portion and the free end portion, the first body portion fixed to the first bracket, the intermediary portion extending away from the first body bracket, the free end portion generally parallel to the second body bracket, the free end portion of the rod is fixedly mounted to the rod portion of the third body bracket.

2. The bracket assembly as set forth in claim 1, wherein the first body bracket further includes a groove extending coaxially along a length of the elongated body member, the first portion of the rod mounted to the groove.

3. The bracket assembly as set forth in claim 1, wherein the first body bracket further includes a pair of flanges disposed on a first end of the first body bracket, the flanges are configured to attach to the component.

4. The bracket assembly as set forth in claim 1, wherein the first body bracket and the second body bracket are integrally formed.

5. The bracket assembly as set forth in claim 1, wherein a free end of the second body bracket is generally circular and includes an aperture configured to receive a mechanical fastener configured to attach the second body bracket to the structure.

6. The bracket assembly as set forth in claim 1, wherein the second body bracket further includes a rib disposed on a proximal end of the second body bracket adjacent a side edge of the first body bracket, the rib configured to allow for flexibility in dimension with respect to the first body bracket.

* * * * *

UNITED STATES PATENT AND TRADEMARK OFFICE
CERTIFICATE OF CORRECTION

| | |
|---|---|
| PATENT NO. | : 9,243,740 B2 |
| APPLICATION NO. | : 13/673046 |
| DATED | : January 26, 2016 |
| INVENTOR(S) | : Alan K. Williams et al. |

It is certified that error appears in the above-identified patent and that said Letters Patent is hereby corrected as shown below:

In the Claims:

At column 7, claim 1, line 6, delete "the first body portion fixed to the first bracket," and insert --the first portion fixed to the first body bracket,--, therefor.

Signed and Sealed this
Seventeenth Day of May, 2016

Michelle K. Lee
*Director of the United States Patent and Trademark Office*